United States Patent
Hamilton

(10) Patent No.: US 7,180,993 B2
(45) Date of Patent: *Feb. 20, 2007

(54) ASSOCIATING CALL APPEARANCE WITH DATA ASSOCIATED WITH CALL

(75) Inventor: Thomas Hamilton, Marlborough, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/958,109

(22) Filed: Oct. 4, 2004

(65) Prior Publication Data

US 2005/0084088 A1    Apr. 21, 2005

Related U.S. Application Data

(63) Continuation of application No. 09/652,335, filed on Aug. 31, 2000, now Pat. No. 6,801,613.

(51) Int. Cl.
*H04M 3/42* (2006.01)
*H04M 3/523* (2006.01)

(52) U.S. Cl. .................. 379/207.02; 379/207.14; 379/207.15; 379/265.02; 379/267

(58) Field of Classification Search ........... 379/201.01, 379/201.02, 201.12, 207.02, 207.14, 207.15, 379/212.01, 214.01, 219, 220.01, 221.02, 379/265.01, 265.09, 267, 900, 265.02
See application file for complete search history.

(56) References Cited

U.S. PATENT DOCUMENTS

| | | | |
|---|---|---|---|
| 3,912,873 A | 10/1975 | Skaperda | |
| 4,289,934 A | 9/1981 | Pitroda et al. | |
| 4,400,587 A | 8/1983 | Taylor et al. | |
| 4,466,098 A | 8/1984 | Southard | |
| 4,527,157 A | 7/1985 | Krikor | |
| 4,605,928 A | 8/1986 | Georgiou | |
| 4,674,036 A | 6/1987 | Conforti | |
| 4,700,381 A | 10/1987 | Eher | |
| 4,723,273 A | 2/1988 | Diesel et al. | |
| 4,737,983 A | 4/1988 | Frauenthal et al. | |
| 4,755,995 A | 7/1988 | Anderson et al. | |

(Continued)

FOREIGN PATENT DOCUMENTS

AU    96/53573    3/1996

(Continued)

OTHER PUBLICATIONS

"Softwire License, Hardware Purchase and Technical Support Agreement", entered into by Geo Tel Communications Corporation, a predecessor in interest to the current Assignee of the subject application, and Putnam Investments, Inc. of Boston, MA 1998.

(Continued)

*Primary Examiner*—Harry S. Hong
(74) *Attorney, Agent, or Firm*—Cesari and McKenna LLP

(57) ABSTRACT

A distributed telephone answering system has intelligence distributed to a plurality of workstations. Each workstation may connect to a plurality of long distance telephone networks. Also, each workstation is controlled by a central controller. A central resopurce such as a database of call context information may be accessed by each workstatin. A workstation may support one or more human users.

20 Claims, 8 Drawing Sheets

U.S. PATENT DOCUMENTS

| | | | |
|---|---|---|---|
| 4,866,763 A | 9/1989 | Cooper et al. |
| 4,879,743 A | 11/1989 | Burke et al. |
| 4,881,261 A | 11/1989 | Oliphant et al. |
| 4,951,310 A | 8/1990 | Honda et al. |
| 4,988,209 A | 1/1991 | Davidson et al. |
| 5,008,930 A | 4/1991 | Gawrys et al. |
| 5,023,868 A | 6/1991 | Davidson et al. |
| 5,027,384 A | 6/1991 | Morganstein |
| 5,029,196 A | 7/1991 | Morganstein |
| 5,031,211 A | 7/1991 | Nagai et al. |
| 5,036,535 A | 7/1991 | Gechter et al. |
| 5,062,103 A | 10/1991 | Davidson et al. |
| 5,073,890 A | 12/1991 | Danielson |
| 5,113,430 A | 5/1992 | Richardson, Jr. et al. |
| 5,134,704 A | 7/1992 | Leuty |
| 5,153,909 A | 10/1992 | Beckle et al. |
| 5,175,866 A | 12/1992 | Childress et al. |
| 5,193,110 A | 3/1993 | Jones et al. |
| 5,214,688 A | 5/1993 | Szlam et al. |
| 5,270,699 A | 12/1993 | Signaigo et al. |
| 5,271,058 A | 12/1993 | Andrews et al. |
| 5,291,492 A | 3/1994 | Andrews et al. |
| 5,291,550 A | 3/1994 | Levy et al. |
| 5,291,551 A | 3/1994 | Conn et al. |
| 5,309,505 A | 5/1994 | Szlam et al. |
| 5,309,513 A | 5/1994 | Rose |
| 5,317,627 A | 5/1994 | Richardson, Jr. et al. |
| 5,335,268 A | 8/1994 | Kelly, Jr. et al. |
| 5,335,269 A | 8/1994 | Steinlicht |
| 5,341,374 A | 8/1994 | Lewen et al. |
| 5,353,339 A | 10/1994 | Scobee |
| 5,355,403 A | 10/1994 | Richardson, Jr. et al. |
| 5,392,345 A | 2/1995 | Otto |
| 5,392,346 A | 2/1995 | Hassler et al. |
| 5,402,474 A | 3/1995 | Miller et al. |
| 5,404,350 A | 4/1995 | Devito et al. |
| 5,450,482 A | 9/1995 | Chen et al. |
| 5,452,350 A | 9/1995 | Reynolds et al. |
| 5,459,780 A | 10/1995 | Sand |
| 5,546,452 A | 8/1996 | Andrews et al. |
| 5,848,143 A | 12/1998 | Andrews et al. |
| 5,878,130 A | 3/1999 | Andrews et al. |
| 5,910,984 A | 6/1999 | Low |
| 5,923,745 A | 7/1999 | Hurd |
| 5,974,114 A | 10/1999 | Blum et al. |
| 6,002,665 A | 12/1999 | Choe |
| 6,002,756 A | 12/1999 | Lo et al. |
| 6,005,920 A | 12/1999 | Fuller et al. |
| 6,070,142 A | 5/2000 | McDonough et al. |
| 6,134,530 A | 10/2000 | Bunting et al. |
| 6,275,574 B1 | 8/2001 | Oran |
| 6,275,930 B1 | 8/2001 | Bonamico |
| 6,363,065 B1 | 3/2002 | Thornton et al. |
| 6,397,345 B1 | 5/2002 | Edmonds et al. |
| 6,411,621 B1 | 6/2002 | Norton et al. |
| 6,426,955 B1 | 7/2002 | Gossett Dalton, Jr. et al. |
| 6,453,039 B1 | 9/2002 | Cutting et al. |
| 6,522,743 B1 | 2/2003 | Hurd |
| 6,529,959 B1 | 3/2003 | Armistead et al. |
| 6,542,586 B1 | 4/2003 | Helstab |
| 6,553,113 B1 | 4/2003 | Dhir et al. |
| 6,556,672 B1 | 4/2003 | Holland et al. |
| 6,570,855 B1 | 5/2003 | Kung et al. |
| 6,584,093 B1 | 6/2003 | Salama et al. |
| 6,674,852 B1 | 1/2004 | Hamilton |
| 6,801,613 B1 * | 10/2004 | Hamilton ............... 379/207.02 |

FOREIGN PATENT DOCUMENTS

| | | |
|---|---|---|
| CA | 2188875 | 9/1996 |
| WO | WO 92/09164 | 5/1992 |

OTHER PUBLICATIONS

Slides entitled Desklink Overview; dated Dec. 2, 1998, were used in an oral presentation made to a prospective customer of Geo Tel on Dec. 2, 1998.

U.S. Appl. No. 09/652,346, filed Aug. 21, 2000 by Hamilton for a Call Management Implemented Using Call Routing Engine, all pages.

U.S. Appl. No. 09/652,335, filed Aug. 31, 2000 by Hamilton for an Associating Call Appearance With Data Associated With Cal, all pages.

U.S. Appl. No. 09/619,875, filed Jul. 20, 2000 by Clifford Atwood et al. for Call Managment Implemented Using Call Routing Engine, all pages.

International Search Report PCT/US 91/08475.

Microsoft Windows 2000 Server, IP Telephony with TAPI 3.0, White paper, Microsoft.

* cited by examiner

ASSOCIATING CALL APPEARANCE WITH DATA ASSOCIATED WITH CALL

CONTINUATION INFORMATION

This application for United States Patent is a continuation of U.S. patent application Ser. No. 09/652,335 filed on Aug. 31, 2000; now issued as U.S. Pat. No. 6,801,613 on Oct. 5, 2004.

CROSS-REFERENCE TO RELATED APPLICATIONS

This application is related to copending U.S. patent application Ser. No. 09/652,346 filed Aug. 31, 2000, entitled "Call Management Implemented Using Call Routing Engine," and to copending U.S. patent application Ser. No. 09/652,445 filed Aug. 31, 2000, entitled "Fault Tolerant Telephony Control." Each of these copending applications is being filed concurrently with the subject application, is assigned to the Assignee of the subject application, and is incorporated by reference in its entirety into the subject application.

BACKGROUND OF THE INVENTION

1. Field of the Invention

The present invention relates generally to techniques for associating a call appearance with data associated with the call, and more specifically, to such techniques wherein the association of the call appearance with the data is based upon matching of non-dialed number identification service (DNIS) call identification data.

2. Background Information

Systems for managing and routing calls through public and/or private communications networks are known in the art. Conventional automatic call distribution (ACD) systems route calls to agents in telemarketing and service inquiry centers, and provide limited real-time call management and reporting capabilities. A typical ACD system will monitor the status of the agent and, when an incoming call is received, selects the agent to handle a particular service request. Reporting and performance data from the agents are also generated by the ACD.

One particular type of scheme for distributing calls to agents is disclosed in Frauenthal et al., U.S. Pat. No. 4,737,983. According to Frauenthal et al., data representing the present call congestion of each of the ACD systems is accumulated in a data base. Using the data in the data base, the percentage of calls made to the ACD systems, as a group, is determined. The information is then used to generate call routing information. When a new call is made to the central office, the routing information is queried to determine which of the ACD systems is to receive the call, so as to balance the call traffic load across the ACD systems.

Another call management and distribution scheme is provided in Gechter et al., U.S. Pat. No. 5,036,535. This patent discloses a system for automatically distributing telephone calls placed over a network to one of a plurality of agent stations connected to the network via service interfaces, and providing status messages to the network. Gechter et al.'s disclosed system includes means for receiving the agent status messages and call arrival messages from the network, which means are connected via a network service interface to the network. Routing means responsive to the receiving means is provided for generating a routing signal provided to the network to connect the incoming call to an agent station through the network. In the system disclosed in Gechter et al., when an incoming call is made to the call router, it decides which agent station should receive the call, establishes a call with that agent station, and then transfers the original call onto the second call to connect the incoming caller directly to the agent station and then drops out of the connection (See, Gechter et al., column 11, lines 45–51).

Other prior art call management, routing, and distribution techniques are disclosed in Andrews et al., U.S. Pat. No. 5,878,130 which is assigned to the assignee of the subject application. This patent discloses a communications system and method for automatically making telephone routing decisions with global authority based upon information gathered in real time from the entire communications system and global optimization criteria. The entirety of the disclosure of the Andrews et al. patent is incorporated herein by reference.

Conventional communications systems of the type disclosed in the aforesaid Andrews et al. patent typically comprise one or more ACD systems connected to each other via at least one public switched telephone network (PSTN). The ACD systems and the PSTN may be controlled by a central controller so as to route calls to and from agents (and/or caller services, such as interactive voice response units) associated with such systems, and callers external thereto, through the ACD systems and PSTN.

The agents associated with such conventional ACD systems typically are provided with respective agent computer-telephony integration (CTI) workstations. Calls received by an ACD system may be routed by the ACD system to the workstations for receipt and processing by the agents using their respective workstations. The ACD system may receive from the PSTN information related to a received call, such as, information identifying the caller and/or calling device telephone number, and may store information related to previous agent-caller transactions; the ACD system may provide this information (hereinafter termed "call-context information"), during the call, to an agent to which the call is routed. The agent may access the call-context information to better enable the agent to process the call. The ACD system may provide call processing intelligence that permits multiple call appearances at the agent workstation to be properly and meaningfully associated (e.g., based upon dialed number identification service (DNIS) data) with the calls' respective call-context information.

Conventional ACD systems typically also implement certain "post-routing" call processing features. A call may be considered to undergo "post-routing" processing when, e.g., after the call has already been initially routed to an initial destination device (e.g., a first agent workstation), the same call is again processed such that another destination device (e.g., another agent workstation) becomes involved in the call. Examples of conventional "post-routing" call processing features include, e.g., the ability to transfer a call, initially routed to a first destination device, from the first destination device to a second destination device, the ability to conference the calling device and the first and second destination devices, the ability to make a consultative call wherein the initial call is placed into a hold status at the first destination device, and thereafter, a call connection is established between the first and second destination devices, etc. In order to improve call-processing efficiency, when a call that is initially routed to an agent undergoes post-routing that involves another agent, it is desirable to provide to the other agent the call-context information of the initially routed call.

Typically, conventional ACD systems are complex devices that may be costly to acquire and integrate into a conventional communication system; thus, the use of conventional ACD systems in such a communication system inherently increases the cost and complexity of the communication system. Accordingly, it would be desirable to reduce or eliminate the need to use conventional ACD systems in such conventional communication systems, while still providing a mechanism that properly and meaningfully associates appearances of calls at the agent workstations with the calls' respective call-context information, even when such call appearances result from or are associated with post-routing call processing. It would also be desirable to provide a mechanism that both enables a supervisory agent to access call-context information of a particular call while the call is being processed by a supervised agent, and facilitates the meaningful intervention, in such a novel call processing environment, of the supervisory agent in the processing of the call by a supervised agent.

SUMMARY OF THE INVENTION

According to the present invention, techniques are provided for, among other things, associating a call appearance with data associated with the call, that overcome the aforesaid and other disadvantages and drawbacks of the prior art. More specifically, in the present invention, techniques are provided for, among other things, matching/associating the appearance of a call at a computer node (e.g., a CTI agent workstation) with data (e.g., call-context information) associated with the call. In one embodiment of a technique according to the invention, the call appearance and the call-context data of the call are received at the workstation. Prior to being received by the workstation, however, the data is initially transferred to the workstation from a data transmission mechanism (e.g., a CTI data network comprising a CTI control mechanism) external to the workstation. The call-context data may include non-DNIS data (e.g., automatic number identification (ANI) and/or calling line identification (CLID) data) that identifies the call. The workstation may associate the call appearance with its associated call-context data based upon whether the call identification data included in the call-context data matches other call identification data (i.e., of corresponding type) delivered to the workstation with the appearance of the call. The call and the other call identification data may be delivered directly to the workstation via a telephone network (e.g., a public switched telephone network (PSTN) or private telephone network).

The workstation may be a supervisory agent workstation associated with a supervisory agent. The transfer of the call-context information to the supervisory agent workstation may be initiated either by the supervisory agent workstation or by another CTI workstation associated with an agent who is supervised by the supervisory agent. The call appearance may be associated with or implement a consultative call, a conference call, or a call transfer operation (e.g., involving the supervisory agent workstation) that permits the supervisory agent to intervene in a meaningful and appropriate manner in the processing of the call by the supervised agent.

The supervisory and supervised agent workstations may be comprised in the same non-ACD agent system or in separate non-ACD agent systems that are capable of providing ACD-like features. Each such non-ACD system may comprise a plurality of distributed computer processes executing in conventional computer systems networked together via conventional computer networking hardware and software and provisioned with appropriate telephony hardware and software.

Advantageously, by using the techniques of the present invention, it is possible to reduce or eliminate the need to use conventional ACD systems in a communications system, while still providing a mechanism that properly and meaningfully associates appearances of calls at the agent workstations with the calls' respective call-context information, even when such call appearances result from or are associated with post-routing call processing. Also advantageously, the present invention enables a supervisory agent to access call-context information of a particular call while the call is being processed by a supervised agent, and facilitates the meaningful intervention of the supervisory agent in the processing of the call by a supervised agent. Thus, advantageously, a communication system implemented using the present invention may be more efficient, less expensive and less complex compared to the prior art.

It will be appreciated by those skilled in the art that although the following Detailed Description will proceed with reference being made to illustrative embodiments and methods of use, the present invention is not intended to be limited to these embodiments and methods of use. Rather, the present invention is of broad scope and is intended to be defined as only set forth in the accompanying claims.

BRIEF DESCRIPTION OF THE DRAWINGS

Other features and advantages of the present invention will become apparent as the following Detailed Description proceeds, and upon reference to the Drawings, wherein like numerals depict like parts, and wherein.

DETAILED DESCRIPTION OF ILLUSTRATIVE EMBODIMENTS

Figure 1:
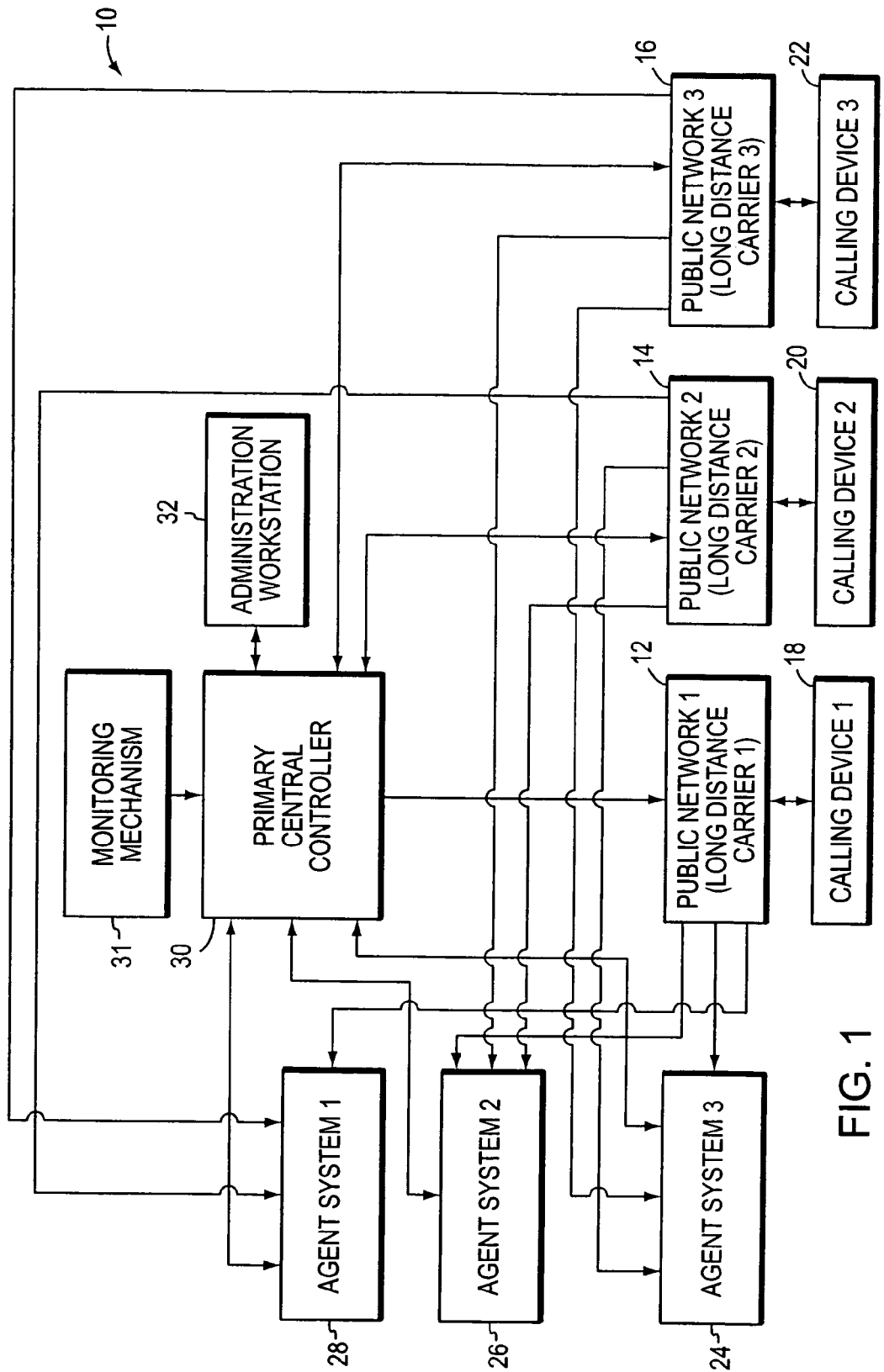
FIG. 1 is a functional block diagram of one embodiment of a communications system wherein the present invention may be practiced to advantage.

FIG. 1 is an architectural-level block diagram illustrating functional components of a communications system 10 wherein the present invention may be practiced. System 10 includes a plurality of agent systems 24, 26, 28 connected to a primary central controller 30 and a plurality of public telephone and/or long distance carrier networks (e.g., British Telecom, Energis, France Telecom, Cable and Wireless, MCI, Sprint, AT&T) 12, 14, 16. Calling devices 18, 20, 22 place calls to called devices (i.e., agent systems 24, 26, 28) via public networks 12, 14, 16. As will be explained more fully below, primary central controller 30 generates command messages for controlling routing and distribution of calls through the long distance carriers to and from the agent systems, and through the agent systems themselves to and from individual workgroups, agents and/or caller services, based upon requested service messages (e.g., telephone numbers and/or other information and messages supplied from the calling devices and public networks, and/or call management request messages from the called devices), status messages (i.e., availability of resources for use by callers, loading of system resources, etc.) supplied by the agent systems, and user-generated call routing control scripts) stored in controller 30. Administration workstation 32 permits user access and control of the system 10 by, for example, permitting generation and modification of system configuration data, call routing scripts, etc. stored in controller 30. Monitoring and diagnostic mechanism 31 monitors the various elements of the system (i.e., the agent systems 24, 26, 28, administration means 32, etc.) to determine whether these elements are functioning properly. If a malfunction is detected, that fact is signaled to the central controller 30, so that it can undertake appropriate action to correct and/or eliminate the malfunction and/or any resulting problems to the system 10 from the malfunction.

Although not shown in the Figures, each of the conventional long distance carriers 12, 14, 16 includes a long distance control network (e.g., AT&T's Signaling System 7 (SS7) control network, MCI's TCP/IP-based control network, Sprint's X.25-based control network and/or foreign telecommunication's CCITT SS7-based control network) and local exchange carriers. The long distance control networks control routing of calls through the long distance network serviced by the exchange carriers. When a long distance call request is initially received by the exchange carrier, from a calling device (e.g., a caller at a calling device dials a long distance telephone number) it forwards the call request to the long distance network, which routes the call to its intended destination. In system 10, when the long distance control network receives a request for long distance connection to one of the agents in the agent systems' workgroups or caller services, the long distance control network forwards the long distance routing request to the central controller 30. As will be described more fully below, central controller 30 then processes the request and controls the system 10 to route the call to a destination in accordance with call routing control scripts executed by the controller 30. The system 10 accomplishes call routing by, inter alia, translating the routing request message into a route response or command message that addresses the desired destination. System 10 also supports routing of calls across local exchange carriers and international PTT's by utilizing substantially the same call control and distribution techniques discussed above.

As is known to those skilled in the art, call destinations are commonly termed "labels." A "label" may be or specify, e.g., a particular destination telephone number.

Figure 2:
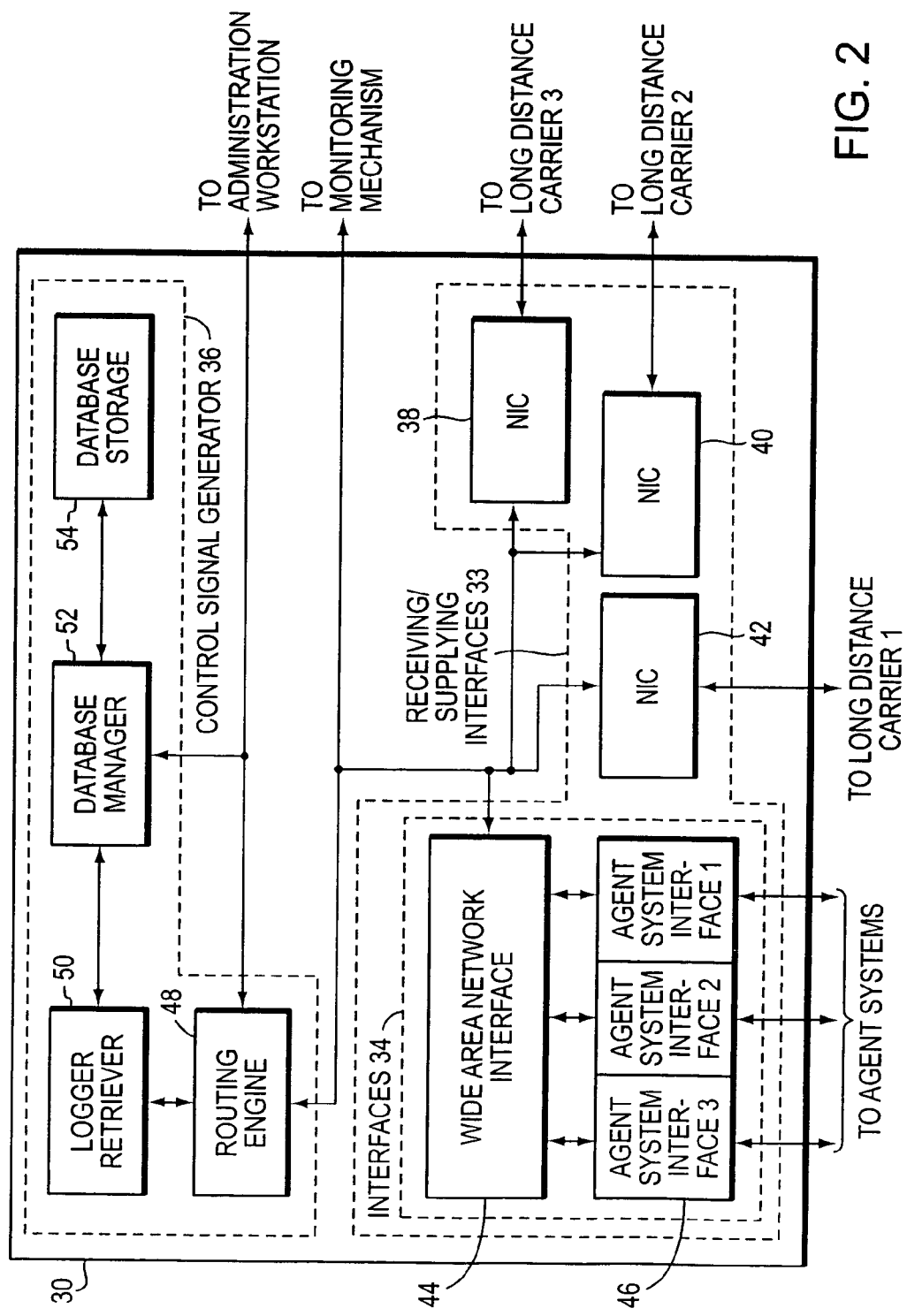
FIG. 2 is a functional block diagram of the primary central controller of the system of FIG. 1.

FIG. 2 is a schematic block diagram illustrating functional components of the central controller 30. Controller 30 includes interfaces 33 for receiving status and requested service messages, and for supplying command messages generating by the controller 30 to the public networks and the agent systems. Interfaces 33 include long distance carrier network interface controllers (NICs) 38, 40, 42 that interface the controller 30 to the public networks 12, 14, 16, respectively. Each of the NICs 38, 40, 42 is appropriately constructed to permit transmission of command messages to and receipt of requested service and other messages from the respective network to which it is connected. For example, if NIC 42 is connected to an AT&T network, then it is appropriately constructed to permit transfer of command and requested service messages between the controller 30 and the SS7 network; additionally, the NIC 42 may be constructed to receive and process from the SS7 network confirmation messages that confirm that command messages provided to the SS7 are proper for the SS7 network and have or are being acted upon by the SS7 network. Other types of carriers must also be similarly accommodated by appropriately constructing the other NICs 40, 38 to permit exchange of such messages between these networks and the controller 30.

Interfaces 33 also include agent interfaces 34 for interfacing the controller 30 to the agent systems 24, 26, 28. Interfaces 34 include agent system interfaces 46 connected to a conventional wide area network interface 44 which connects the controller 30 to the interfaces 34 so as to permit transmission of status and other messages from the agent systems to the routing engine 48, and to permit transmission of command and other messages to the agent systems 24, 26, 28. It should be understood that the particular types of interfaces 46 used will depend upon the particular constructions of the agent systems, the wide area network (not shown) that connects the controller to the agent systems, and the controller itself. Interface 44 may be adapted for use with a conventional TCP/IP (Transmission Control Protocol/Internet Protocol) network (not shown, which connects the controller to the agent systems), although alternatively, interface 44 may be constructed for use with networks that use other network protocols.

Figure 5:
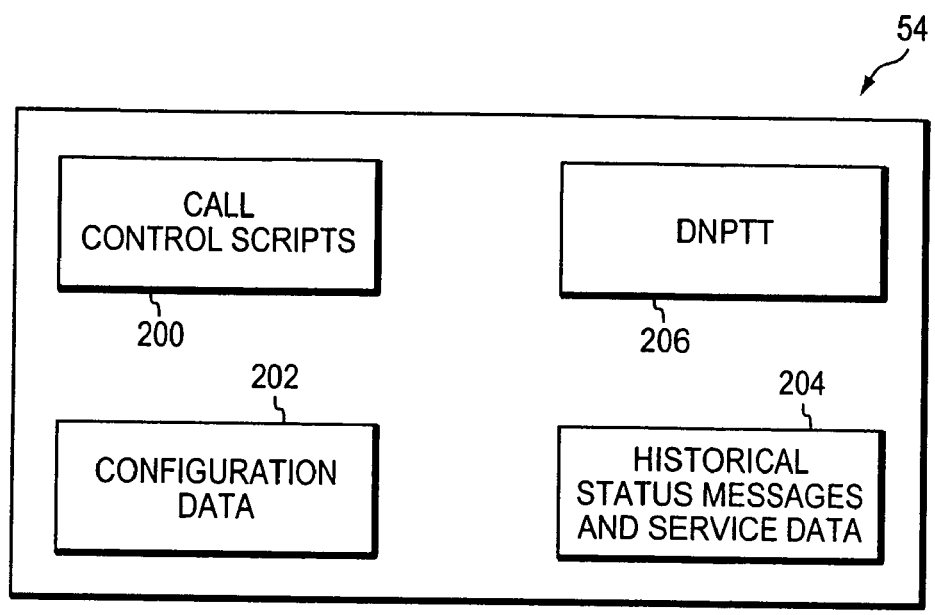
FIG. 5 is a schematic block diagram illustrating data structures in the database shown in FIG. 4.

Control signal generator 36 is connected to the interfaces 33, monitoring mechanism 31, and administrative workstation 32. Control signal generator 36 comprises routing engine 48, database logger/retrieving engine 50, database manager 52, and database 54. Routing engine 48 determines how to route calls in the system 10 (i.e., through the public networks to the agent systems, and in the agent systems themselves), and transmits this routing information (e.g., in the form of appropriate command messages) that address the desired end-termination (e.g., an agent station or computer-telephony (CTI) workstation in a workgroup or a caller service in the system) to interfaces 33, 34 for transmission to the agent systems and long distance control networks, respectively. In order to determine how to route calls in the system, routing engine 48 may take into consideration, among other things, real-time requested service messages supplied to it by the interfaces 33, system configuration data 202 (see FIG. 5) and historical (i.e., previously stored) requested service data derived from requested service messages and status messages 204 retrieved by logger/retriever 50 at the command of the routing engine 48 from the system's historical database (comprising database manager 52 and storage mechanism 54), real-time status messages from the agent systems supplied to it from the interfaces 34, information from the monitoring mechanism 31 concerning what components (if any) of the system are currently unavailable because they are malfunctioning or inoperative, and routing optimization criteria and/or rules and commands in the form of call routing control scripts 200 generated by the administration workstation and stored in database 54. Routine engine 48 uses this data to determine the manner in which to route calls in the system. After making its decision on how best to route a particular call, generating appropriate command messages to implement this decision, and transmitting the command messages to the interfaces 33 and 34, routing engine 48 instructs logging engine 50 to store the real-time information presented above in the database 54 for use in determining how to route later calls. Logging engine 50 in turn, commands database manager 52 to store this information in database 54.

Figure 3:
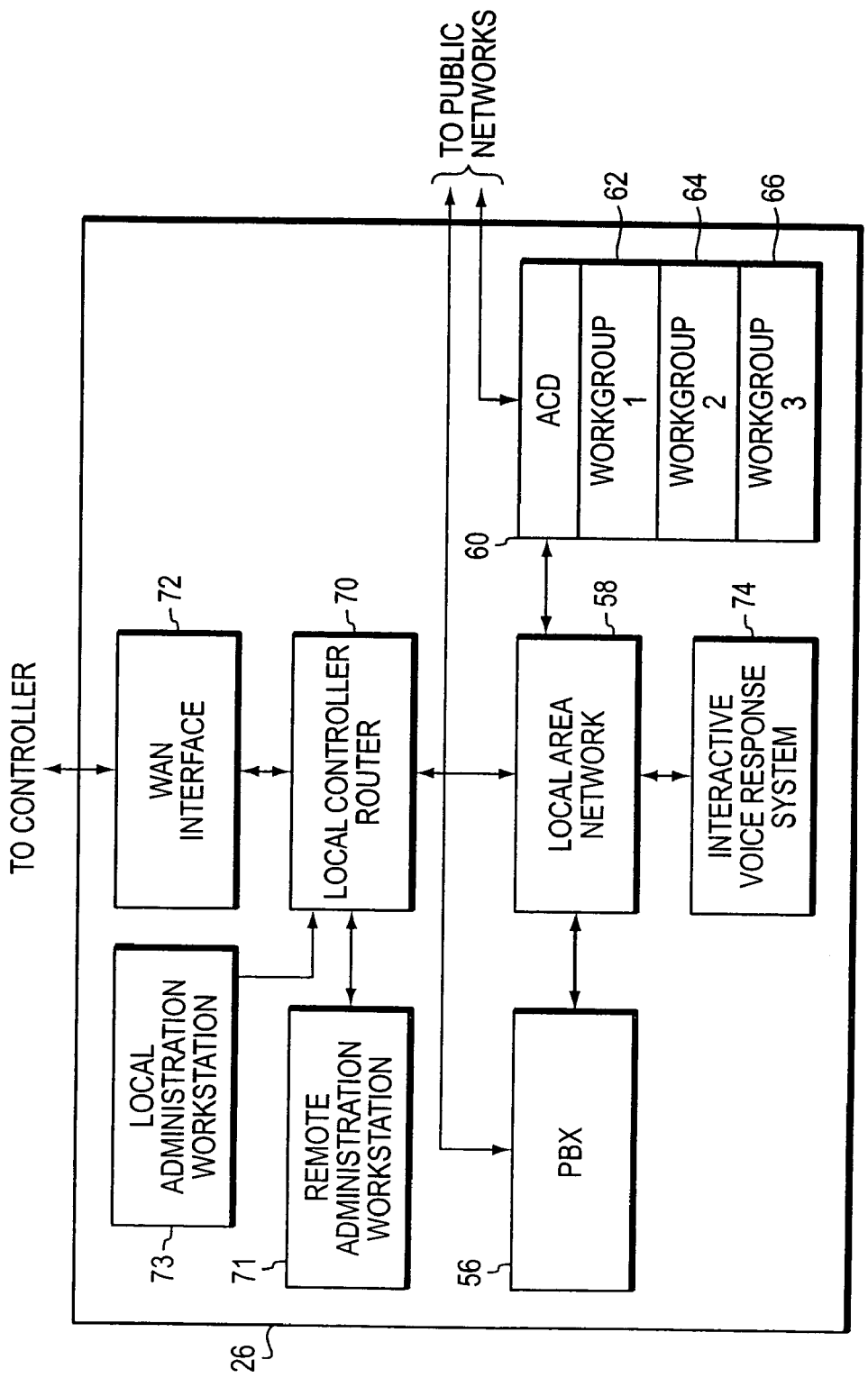
FIG. 3 is a functional block diagram of one type of agent system that may be used in the system of FIG. 1.

FIG. 3 is a functional block diagram of one type of agent system that may be used in the system of FIG. 1. Agent system 26 comprises an interface 72 for interfacing the agent system's local controller/router 70 to the controller's wide area network interface 44, so as to permit transfer of command and other messages from controller 30 to local controller 70 and status and other messages from the local controller 70 to controller 30. In response to command and other messages received by local router 70 from controller 30, local router 70 issues commands to the ACD/IVR, or PBX system causing public network interfaces (not shown) in the ACD, PBX or IVR to connect and disconnect calls received thereat from the public networks to and from appropriate caller services (e.g. interactive voice response system 74) or individual agents (e.g. connected to private branch exchange (PBX) 56 or ACD 60). It should be noted that the particular type and number of caller services and agent workgroups shown in FIG. 3 are merely for illustrative purposes and may vary. Local router 70 issues commands via the conventional local network 58 to the caller service or individual agent system in the workgroup to which the call is connected, as to how the individual agent or caller service is to distribute or process the call. For example, depending upon the command messages transmitted by the controller 30 to controller 70, controller 70 may instruct the call to be forwarded directly to the interactive voice response system 74 which is connected as an answering resource to ACD 60, and instruct the interactive voice response system to store information from the call for later retrieval and transmission to a workstation (not shown) connected to the PBX 56, or to connect the call to the ACD 60 and instruct the ACD to forward the call to one of its workgroups 62, 64, 66. Of course, it will be appreciated that if appropriately modified, the network interfaces may be comprised within the public networks or may comprise separate, stand-alone interfaces distinct from the agent systems. Likewise, if the PBX, IVR, and/or ACD are appropriately modified so as to include other of the various functional components of the agents (e.g. router 70), they may be eliminated, or comprised as separate functional components from the agent system. Local controller 70 also queries the individual agents and caller services for status information (e.g. whether they are active or busy, what resources are available for use by callers, etc.), gathers this status information via the local network 58, and transmits this information to the central controller 30 via interface 72 for use in the central controller's routing decisions.

Agent system 26 may also comprise local administration workstation 73 for permitting user control of the local router 70, and remote administration workstation 71 for permitting remote control of central controller 30. Both administration workstations 73, 71 are of similar construction to administration workstation 32. Local administration workstation 73 may be limited in its ability to control local router 70 (i.e., only to control matters not being controlled by central controller 30). Likewise, remote administration workstation 71 may be limited in its authority over system 10 such that administration workstation 32 may override commands issued by administration workstation 71.

Figure 4:
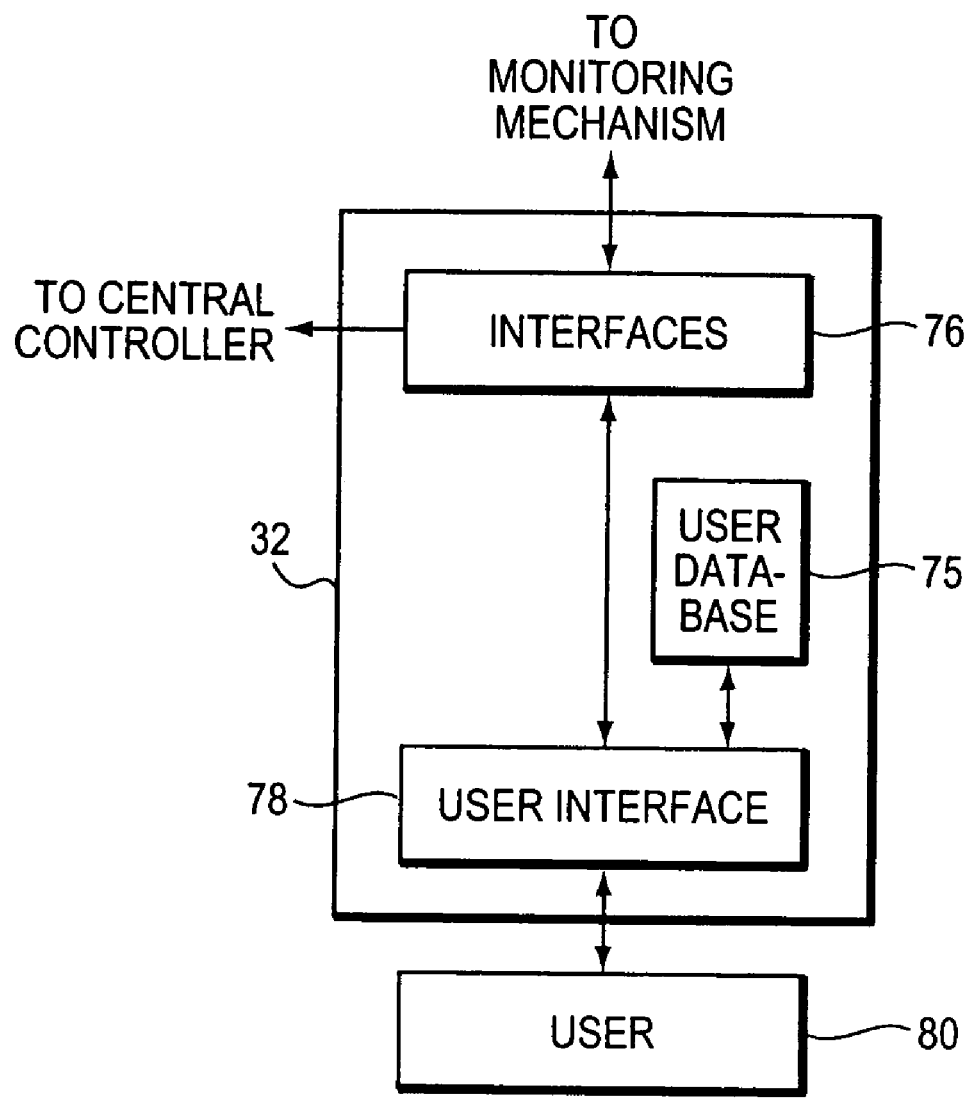
FIG. 4 is a functional block diagram of an administrative workstation used in the system of FIG. 1.

FIG. 4 is a functional block diagram of administration workstation 32. Workstation 32 may comprise a user input/output interface 78 connected to central controller interface 76. User interface 78 may comprise a graphical user interface for permitting a human user 80 to generate, edit, and store call control routing scripts 200, system configuration data 202, global dialed number plan translation table 206, etc. in the database 54 of the central controller 30. The database interface 76 is adapted to change the user's graphically input data into a form usable by the central controller in the central controller's database 54. Administration workstation 32 comprises a user-accessible database 75 for storing real-time information and configuration information and for permitting such information to be communicated to a human user via the user interface 78. Also, administration workstation 32 permits a user to monitor various system activities and current system information, such as, call routing, system configuration, etc.

Figure 6:
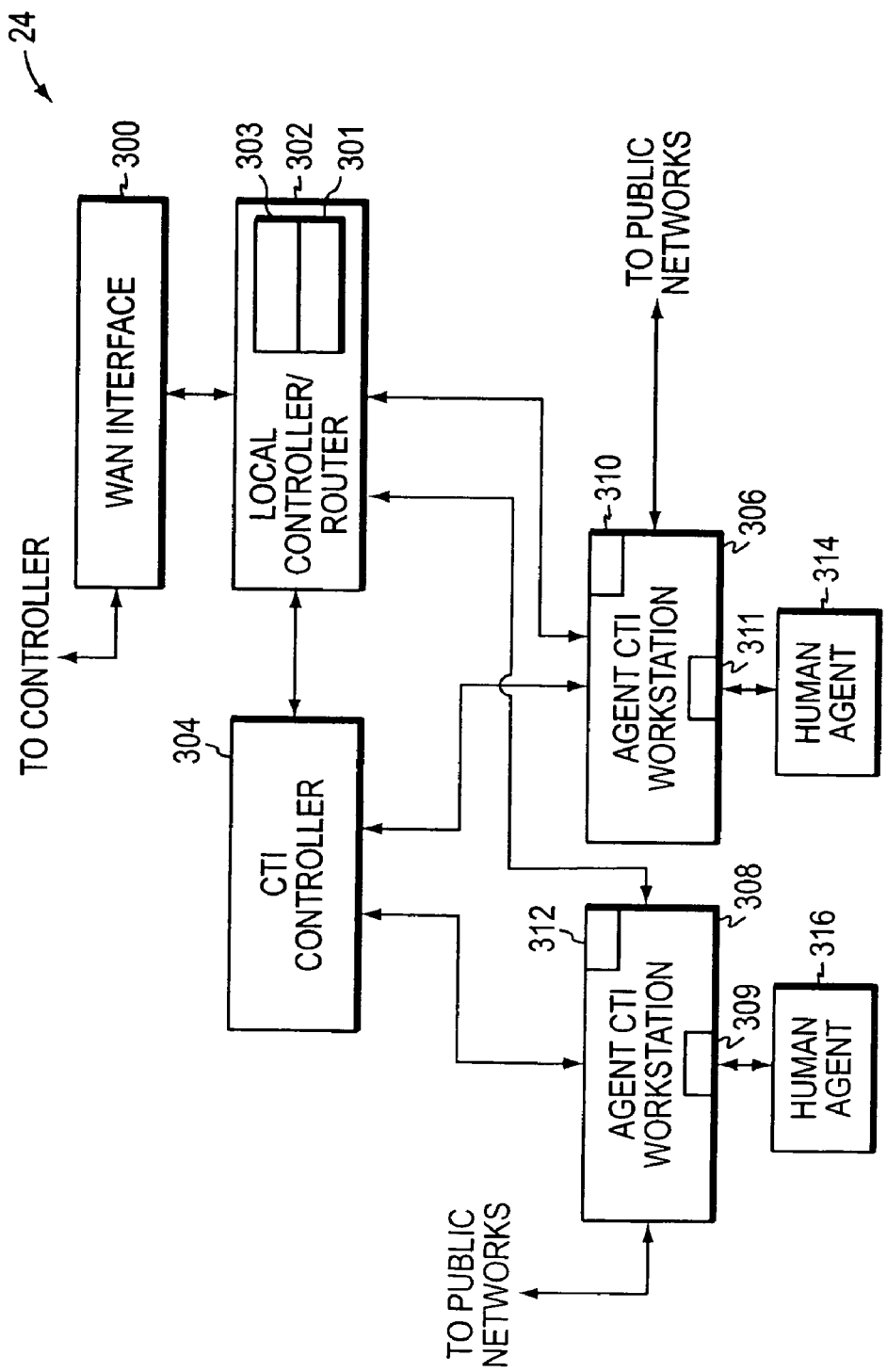
FIG. 6 is a functional block diagram of another type of agent system that may be used in the system of FIG. 1.

FIG. 6 is a functional block diagram of another type of agent system 24 that may be used in system 10. In contrast to the agent system 26 whose construction is illustrated in FIG. 3, the agent system 24 does not include an ACD system. Instead, as will be described more fully below, agent system 24 comprises, among other things, a plurality of computer program processes executing in a plurality of computer nodes that operate in a such a way as to permit agent system 24 to exhibit certain ACD-like functionalities. As is shown in FIG. 6, non-ACD agent system 24 comprises a wide area network interface 300 for interfacing the local controller/router 302 of the agent system 24 to the wide area network interface 44 of the central controller 30, so as to permit transfer of command and other messages from controller 30 to local controller 302 and status and other messages (including CTI event status messages) from the local controller 302 to controller 30. In response to command and other messages received by local controller 302 from the central controller 30, local controller 302 issues commands and data to the CTI controller 304, and also issues commands to the agent CTI workstations 306, 308.

More specifically, each workstation 306, 308 comprises respective telephony-related hardware and executing software processes (e.g., based upon the Telephony Application Program Interface (TAPI) of Microsoft Corporation of Redmond, Wash.) that permit the workstations 306, 308 to receive and process incoming calls from, and to establish outgoing calls to, the networks 12, 14, 16. By controlling the hardware and software processes, controller 302 is able to control the telephony operations of the workstations 306, 308, including answering and termination of incoming calls, and establishment and termination of outgoing calls. The telephony hardware may also include conventional mechanisms (e.g., comprising respective agent telephone headsets and mouthpieces) for permitting the agents 314, 316 to communicate with the callers involved in such incoming and outgoing calls, and conventional mechanisms for providing physical connectivity to the networks 12, 14, 16 (e.g., comprising respective Music Telecom 1×1™ telephony device cards 310, 312).

The commands and data issued by the controller 302 to the controller 304 may control the provision of, among other things, agent status and call processing-related information from the controller 304 to application processes (not shown) executing in the individual workstations 306, 308. For example, based upon commands and data that it receives from the local controller 302, CTI controller 304 may gather information related to the processing of calls by, and the current status of, the workstations 306, 308 and agent system 24, and may provide that information to these application processes, and to the controller 302. Such information may include, e.g., whether a particular agent workstation is busy (i.e., actively "off-hook" and connected to a call), waiting to receive a call, connected to an as yet unanswered call, available to receive a call, etc. These application programs may then use computer/user interfaces 311, 309 to display this information in a form that is understandable by human agents 314, 316, respectively, so as to permit the agents 314, 316 to be able to monitor the processing of calls by their respective workstations 306, 308 and by the system 24. These application program processes and interfaces 311, 309 also provide a mechanism by which agents 314, 316 may request the establishment of outbound calls from the agent system 24 via one or more of the networks 12, 14, 16, using an embodiment of the technique of the present invention, and may request changes in respective statuses of the workstations 306, 308 (e.g., the agents 314, 316 may request the termination of particular calls received or initiated by the workstations).

As will be described more fully below, controller 304 may also provide to the workstations, based upon commands and data received from the controller 302, call-context information concerning calls received by the workstations. The contents of such call-context information may vary among different implementations of system 10, and may be selected by commands provided to the system 10 by the user 80 using the workstation 32. For example, such call context information may include CLID, correlation identification, IP telephony globally unique call identification, and/or ANI-related information, digits entered or dialed by the caller placing the call, customer account or personal identification numbers and/or other information related to previous business transactions made by the caller (e.g., customer account balance and billing/order information), and/or other call-identification-related information (e.g., identification information uniquely assigned by the router 48 to each call routed by router 48). The call-context information may be initially gathered by, and forwarded to, the controller 302 by the controller 30.

Figure 8:
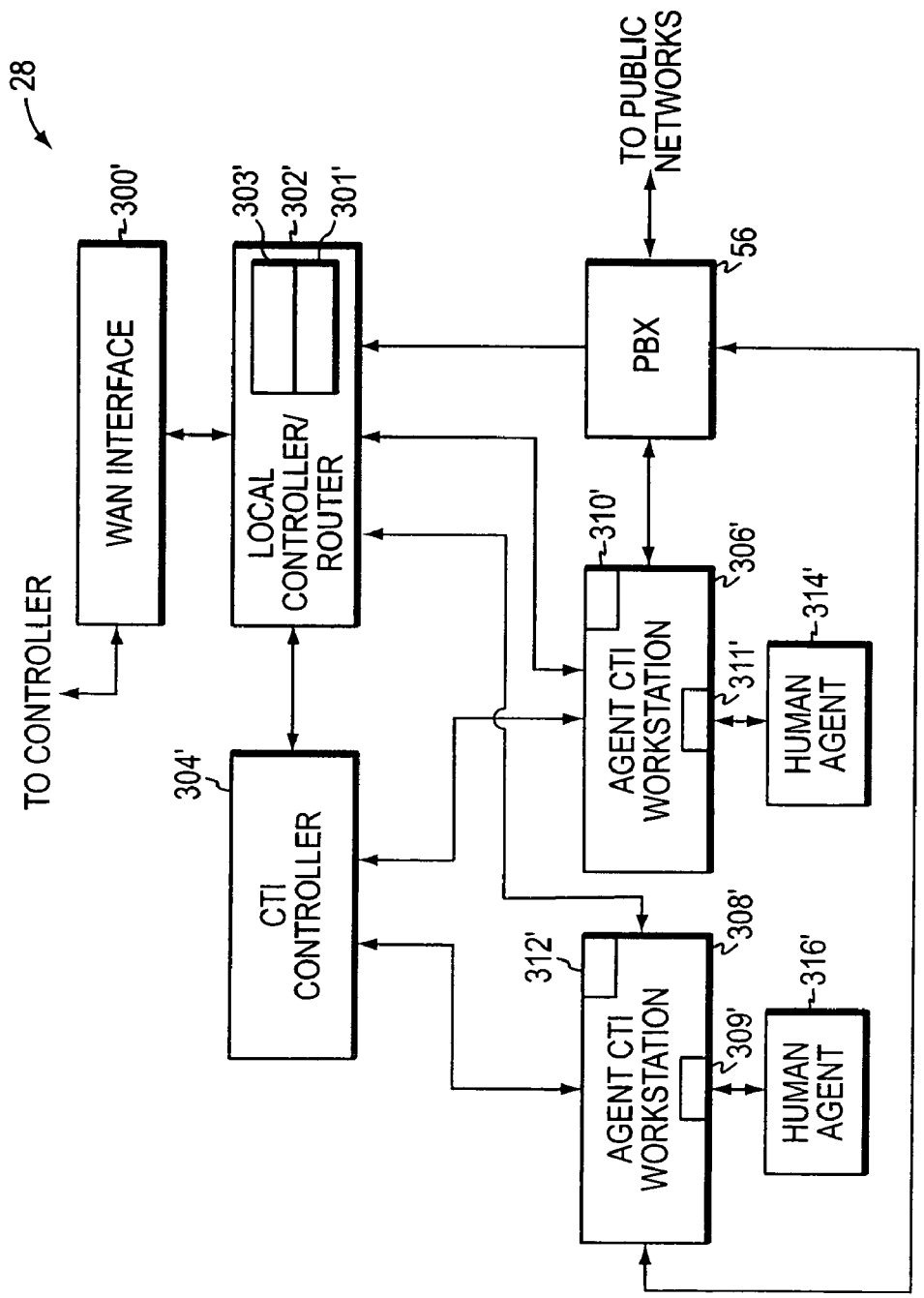
FIG. 8 is a functional block diagram illustrating the construction of another agent system of the type shown in FIG. 6.

As shown in FIG. 8, agent system 28 may have the same construction as agent system 24, except that, as will be described more fully below, system 28 may include a conventional PBX system 56 that may be controlled by the controller 302' so as to facilitate implementation of post-routing features, such as, call conferencing, consultative calling, and call transfer features among agent workstations in the agent systems 24, 28, as will be appreciated by those skilled in the art, however, if networks 12, 14, 16 are configured to provide Centrex™-like services that may be controlled by the agent workstations and/or controller 302', then the need to use PBX 56 in system 28 may be eliminated, and additionally, controller 302' and/or workstations 306', 308' of system 24, may be used to control networks 12, 14, 16 to facilitate implementation of such features. The primed elements of system 28 may have the same or similar functionality and operation as the corresponding unprimed elements of system 24.

The above-presented functional components (with the exception of public networks 12, 14, and 16 and PBX 56 and ACD system 60 of agent system 26, and the PBX system 56 of agent system 28) of system 10 may be embodied as, or comprise one or more distributed computer program processes executing in a plurality of computer nodes; each of these nodes may include computer-readable memory for storing software programs, algorithms, and data structures associated with, and for carrying out, the inventive techniques, and related and other techniques and methods described herein as being carried out by or implemented in system 10. In addition, each of these nodes may further include a processor (e.g., an Intel 80×86 processor) for executing these software programs and algorithms, and for manipulating the stored data structures, to enable the nodes to carry out these methods and techniques in system 10. Additionally, the nodes may be provisioned with such networking hardware and software (e.g., including computer networking and telephonic communications hardware and software) as is needed to enable performance of the stated functionality.

It should be noted that the functional components of the system 10 may vary depending upon particular functional and operational requirements. For example, the existing components of system 10 may be modified to incorporate the functionality of, or the system 10 may be modified to include, fault-tolerance-related functional components (e.g., a redundant central controller), components related to processing of Internet calls, and/or call-queuing-related components described in the aforesaid Andrews et al. patent (i.e., U.S. Pat. No. 5,878,130). Accordingly, it should be appreciated that the present invention may be practiced in systems other than system 10 (e.g., in systems having different and/or additional functional components like those described in the aforesaid Andrews et al. patent, and other communications systems).

With reference being made to FIGS. 1–8, one embodiment of the techniques of the present invention now will be described. System 10 implements a global dialed number plan, the details of which are set forth in copending U.S. patent application Ser. No. 09/652,346 entitled "Call Management Implemented Using Call Routing Engine", filed concurrently with the subject application and assigned to the Assignee of the subject application; the entirety of the disclosure of said copending application is hereby incorporated herein by reference. The dialed number plan disclosed in said copending application will be described briefly below for purpose of completeness.

In use, in system 10, each CTI agent workstation 306, 308 that is comprised in an agent system of the type illustrated in FIG. 6 initially is in an off-line condition wherein no active network sessions are established between the workstations and the CTI controller 304 or local controller 302 via which the controllers 302, 304 may issue CTI and telephony commands to the workstations that will be implemented by the workstations, or via which workstation call processing and call context-related information may be exchanged between the controller 304 and the workstations. In order for the workstations 306, 308 to enter an on-line condition wherein such active network sessions are established, each workstation 306, 308 must go through a respective log-in negotiation process to establish respective active network sessions. For purposes of clarity of description, the log-in negotiation process that is undergone by workstation 306 will be described. However, it should be understood that, in order to go from an off-line condition to an on-line condition, each of the CTI agent workstations in an agent system of type illustrated in FIG. 6 must undergo an identical respective negotiation process.

The log-in negotiation process of workstation 306 commences with the generation and issuance by the workstation 306 of an initial log-in request that is forwarded to the CTI controller 304. The generation and issuance of the log-in request to the controller 304 may be initiated by the human agent 314 associated with the workstation 306 by activating Active-X log-in processes using the interface 311. A valid log-in request validly specifies (or contains) at least the following information: a unique alphanumeric identification string associated with the human agent 314 (hereinafter referred to as the "agent ID" of agent 314) and a password associated with the agent ID. The log-in request may optionally include an instrument identification string (hereinafter referred to as the "instrument ID"). The instrument ID essentially is a concatenation of respective values that together define the particular physical telephony device (e.g., the device 310 in workstation 306) in system 24 to and from which calls may be routed. These values are delimited by predetermined delimiting characters and may specify a directory number (which may, e.g., comprise or specify the telephone number of the workstation 306) associated with the workstation 306, a TAPI identification number associated with the device 310, and a physical TAPI address associated with the device 310.

A valid log-in request may also optionally specify additional information (hereinafter referred to as "device target information") that may further define the telephony device 310 associated with the agent 314 and the agent's workstation 306. The device target information may comprise or specify a system-wide unique logical name or handle of the device 310, an indication of the type of device being defined (e.g., whether the device is a voice telephony device), system-wide unique physical (e.g., medium access control) and/or logical (e.g., Internet protocol) addresses for the device 310, the time zone (specified in offset minutes from Greenwich Mean Time) within which the device 310 is operating, the number of telephone lines/channels managed by the device 310, and configuration parameters that associated with device 310 (e.g., TAPI line device address of device 310, dual tone multifrequency signals necessary to command device 310 to desired telephony operations, etc.).

After agent 314 activates the Active-X log-in processes, these processes prompt the agent 314 (via a log-in screen generated by interface 311) to enter the agent ID and password. The log-in screen may also permit the agent 314 to enter the instrument ID and device target information. Alternatively, the workstation 306 may be configured to automatically determine this information and provide it to the log-in processes. After the agent 314 has entered the agent ID and password, and optionally, the instrument ID and device target information have been entered or provided to the processes, the agent 314 may command the log-in processes (via interface 311) to forward the log-in request to the CTI controller 304.

In response to these commands, the workstation 306 then forwards the log-in request with the agent-entered log-in information (i.e., the agent ID and password, and optionally, the instrument ID and device target information) to the CTI controller 304. After CTI controller 304 receives the log-in request and accompanying information, the controller 304 forwards them to the controller 302.

Controller 302 maintains one or more agent workstation configuration tables 301 wherein valid agent IDs and respective valid passwords are associated with previously-stored, respective instrument IDs (and the respective separate values comprising the respective instrument IDs) and device target information. The controller 302 may validate the log-in request by comparing the agent ID and password submitted with the log-in request for conformity with a valid agent ID and respective valid password stored in the tables 301. If the controller 302 finds that such conformity exists, and the log-in request contains instrument ID and/or device target information, the controller 302 determines that a valid log-in request has been made by the agent 314, and then updates the respective instrument ID (and respective separate values comprising the respective instrument IDs) and/or device target information associated with the agent-entered agent ID and password in the tables 301 to conform with the corresponding information contained in the log-in request.

Alternatively, if the controller 302 finds that the agent ID and password submitted with the log-in request match an agent ID and associated password in the tables 301, but instrument ID and/or device target information was not submitted with the log-in request, the controller 302 determines that a valid log-in request has been made by the agent 314, but does not change the information contained in the tables 301.

Conversely, if the controller 302 finds that the agent ID and password submitted with the log-in request do not match a valid agent ID and associated password stored in the tables 301, the controller 302 may cause the controller 304 to issue commands to the workstation 306 that cause the interface 311 to indicate to the agent 314 that the log-in request has failed, and optionally, to request that the agent 314 resubmit a different agent ID and password pair.

After the controller 302 determines that a valid log-in request has been made by the workstation 306, the controller 302 issues commands to the controller 304 and workstation 306 to establish the necessary network session(s) that cause the workstation 306 to go into an on-line condition. The controller 302 then transmits to the routing engine 48 one or more messages that (1) inform the routing engine 48 that a valid log-in request has been made by the agent 314 and specify the agent ID of agent 314, (2) request that the engine 314 inform the controller 302 as to any workgroups to which the agent 314 may belong, (3) provide the routing engine 48 with any updated information (i.e., instrument ID (and respective separate values contained in the instrument ID) and/or device target information that was submitted with the log-in request), and (4) request that the engine 48 log-in the agent 314 to the system 10 as being in actively networked status (e.g., as being available to receive calls routed thereto by the engine 48, request establishment of outgoing call therefrom, etc.).

Figure 7:
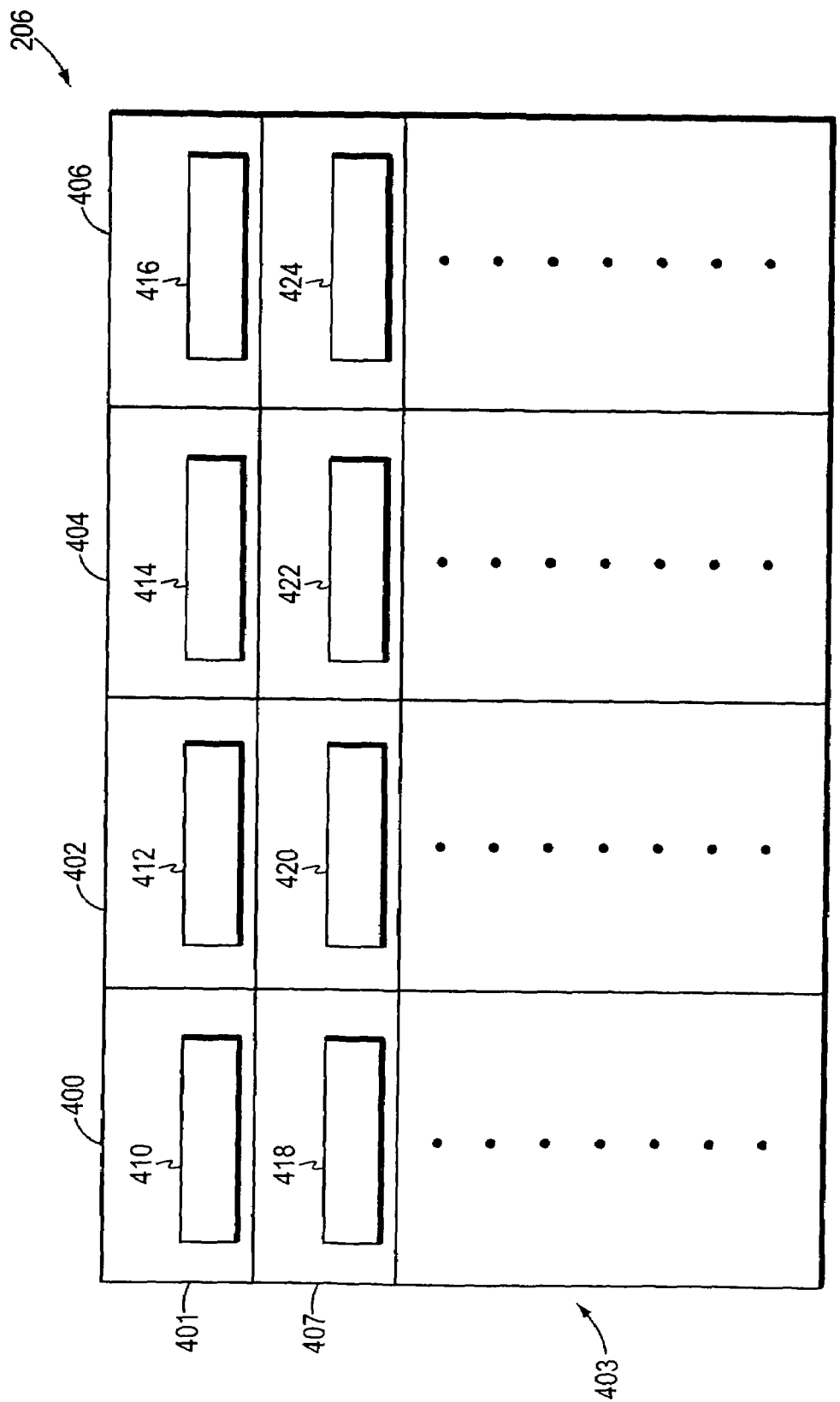
FIG. 7 symbolically illustrates information that may be contained in one of the data structures stored in the database shown in FIG. 5.

Routing engine 48 maintains at least one global dialed number translation table 206. As shown in FIG. 7, table 206 includes a plurality tuples 403; in each of the tuples 403, a respective agent's agent ID information 400 is associated with the respective agent's instrument ID (and respective values comprised therein) and device target information 402, a listing 404 of the workgroups to which the respective agent belongs, and a respective label 406 of the respective agent. For example, in tuple 401, the agent ID 410 of agent 314 is associated with the instrument ID (and respective values comprised therein) and device target information 412 of agent 314, a listing 414 of the workgroups to which agent 314 belongs, and a label 416 of the device 310 in the workstation 306 with which agent 314 is associated. Similarly, in tuple 407, the agent ID 418 of agent 316 is associated with the instrument ID (and respective values comprised therein) and device target information 420 of agent 316, a listing 422 of the workgroups to which agent 316 belongs, and a label 424 of the device 312 in the workstation 308 with which agent 316 is associated. It should be understood that although not shown in FIG. 7, respective tuples exist in the table 206 wherein the respective agent IDs of agents 314', 316' are associated with respective instrument ID (and respective values comprised therein) and respective device target information of the agents 314', 316', respective listings of the workgroups to which the agents 314', 316' belong, and respective labels of the devices 310', 312'.

When engine 48 receives the one more messages from controller 302, the engine 48 accesses the information in the table 206 and determines based upon the agent ID 410 supplied in the messages, which workgroups the agent 314 is associated. The engine 48 also updates the other information 412, 414, 416 in the table 206 (and also in the configuration data 202) to conform with any updated information (i.e., instrument ID (and respective separate values contained in the instrument ID) and/or device target information) provided in the messages. After performing these actions, the engine 48 updates the configuration data 202 to indicate that the agent 314 is now in an actively networked status. The engine 48 issues to the controller 302 one or more messages that indicate to the controller 302 the workgroups to which the agent 314 belongs and that the agent 314 has been logged into the system 10 in an actively networked status.

After the controller 302 receives the indication from the engine 48 that the agent 314 has been logged into the system 10 in an actively networked status, the controller 302 transmits one or more messages to the controller 304 that indicate that agent 314 has been logged into the system 10. In response to these messages, the controller 304 completes the log-in negotiation process by providing messages to the workstation 306 that indicate that the agent 314 and workstation 306 are now logged-in.

In use, in system 10, when an agent (e.g., agent 314') in one agent system (e.g., agent system 28) wishes to place an outbound call to another agent (e.g., agent 314) in another agent system (e.g., agent system 24), the agent 314' may enter appropriate commands via the application programs and user interface 311' of the agent's associated workstation 306' that cause the workstation 306' to issue to the controller 304' an outbound call request (OCR). Instead of reciting or specifying the actual valid telephone number of the agent 314 that agent 314' desires to call, the OCR issued by the workstation 306' to the controller 304' may contain or specify the agent ID 410 of agent 314. When the CTI controller 304' receives the OCR from workstation 306', the controller 304' forwards it to the controller 302'.

When controller 302' receives the OCR forwarded from the controller 304', the controller 302' may first consult local dialed number plan translation table (DNPTT) 303' to determine whether conventional conversion algorithms are specified in the local DNPTT 303' for the agent ID 410 of the workstation 306. The DNPTT 303' may also associate with each valid agent ID 400 in system 10 a respective logical variable (not shown) whose value may indicate whether the respective actual label of the agent 314 associated with the agent ID 410 is to be determined by the controller 302' using conventional dialed number plan conversion algorithms specified in the local DNPTT 303', or alternatively, is to be determined by the routing engine 48 using the global DNPTT 206. For purposes of this discussion, it is assumed that the value of the respective logical variable associated with the agent ID 410 indicates that the routing engine 48 is to determine the destination label of the agent 314 associated with the agent ID 410 using the global DNPTT 206; after the controller 302' determines that the value of this respective logical variable indicates that the engine 48 is to make this determination, the controller 302' issues to the engine 48 a call routing request (CRR) that includes the agent ID 410 and requests that the engine 48 provide the controller 302' with the destination label associated with the agent 314 whose agent ID 410 is included in the CRR. Conversely, if the value of this respective logical variable does not indicate that the engine 48 is to make this determination, the controller 302' may make said determination based upon conventional dial plan conversion algorithms specified in the local table 303' and may cause the telephony device 310' to call the agent 314 (e.g., via one 12 of the networks 12, 14, 16) using the thus determined destination label of the agent 314.

Routing engine 48 associates a respective predetermined subset of call control script instructions 200 with each respective valid agent ID for which the engine 48 can be requested to select a respective destination label. These respective subsets of instructions 200, when executed by the engine 48, cause the engine 48 to determine and apply respective conversion algorithms to the respective agent IDs to determine destination labels that may be used to establish calls to agents associated with the agent IDs.

When the routing engine 48 receives the CRR, the engine 48 executes, in response to the received CRR, the respective predetermined subset of control script instructions 200 that is associated with the agent ID 410. This subset of instructions 200, when executed, determines and applies to the agent ID 410 conversion algorithms that result in the determination of a destination label that is to be used by the agent system 28 to establish the requested outgoing call to the agent 314. For example, when executed, the subset of instructions 200 associated with the agent ID 410 may cause the engine 48 to determine, based upon real-time status messages received from the agent system 24, the information in the DNPTT 206, and real-time configuration data 202, whether the agent 314 presently is available to receive and answer a call placed to agent 314, and if the agent 314 is unavailable to receive and answer the call, to select another agent (e.g., agent 316), in the same workgroup as the agent 314, who presently is available to receive and answer such a call. The subset of instructions 200 may then cause the engine 48 to select, based upon the information in the table 206, from among the destination labels (e.g., labels 416, 424) of the telephony devices 310, 312 associated with the agents 314, 316 in the same workgroup, respectively, a destination label 424 associated with the selected available agent 316. Alternatively, upon determining that the agent 314 is unavailable, the engine 48 may wait a predetermined period of time, or until the agent 314 becomes available, to continue execution of the subset of instructions 200.

Conversely, if the agent 314 is presently available to receive and answer the call, the executed subset of instructions 200 may cause the engine 48 to select, based upon the information in the table 206, a destination label 416 associated with the agent 314.

Once the engine 48 has selected a destination label (e.g., label 416) in response to receipt of the CRR, the engine 48 transmits to the controller 302' a reply to the CRR that specifies the selected destination label 416. Optionally, prior to transmitting the reply to the controller 302', the engine 48 may evaluate, using conventional outgoing call permission techniques, whether the agent 314' that initially requested the outgoing call is authorized to place a call to the selected label. The engine 48 may make this evaluation based upon outgoing call agent permission level entries (not shown) that may be preconfigured in the table 206. These entries may associate outgoing call permission levels with respective agent IDs so as to enable the engine 48 to determine whether the agent 314' requesting the outgoing call is authorized to request that type of outgoing call (e.g., an international long distance, national long distance, etc. call). If the engine 48 determines that the agent 314' requesting the outgoing call is not authorized to request the type of outgoing call being requested, the engine 48 may provide, instead of a reply specifying the destination label 416, a message to the controller 302' that indicates that the CRR is invalid; the controller 302' may then provide to the workstation 314' a message that indicates that the engine 48 has rejected the CRR and the agent 314' is not authorized to request that type of outgoing call.

When the controller 302' receives the reply specifying the destination label 416, the controller 302' causes the device 310' to place a call via one 12 of the networks 12, 14, 16 to the destination (i.e., device 310) addressed by the destination label 416. Contemporaneously, the engine 48 may cause the controller 302 of the system 24 to command the device 310 and workstation 306 to receive and process the call when it arrives at the device 310'.

In accordance with this embodiment of the present invention, when an agent workstation (e.g., workstation 306 in agent system 24) receives a call appearance from a network (e.g., network 12), the network 12 from which the call is received may forward directly to the workstation's telephony device 310, together with the call, non-DNIS call identification data associated with, and identifying the call. Such non-DNIS call identification data may comprise, if the received call is delivered from a plain old telephony service (POTS) call, ANI, CLID, and/or call correlation identification data of the received call. Alternatively, if the received call is an IP telephony-based call, the non-DNIS call identification data may comprise IP telephony globally unique call identification data and/or IP source port/address information of the received call.

When the controller 304 provides call-context information to the workstation 306, the information, as received by the workstation 306 from the controller 304, is segmented into respective data structures, with each data structure comprising respective call-context information to be used in processing a respective call to be received by the workstation 306. Each such data structure may include, among other things, respective non-DNIS call identification data that corresponds to (i.e., is of the same type as) the respective non-DNIS call identification data of a respective call that is expected to be delivered to the workstation 306 by the network 12.

In accordance with this embodiment of the present invention, when a respective workstation (e.g., workstation 306) receives respective call-context data structures, the respective workstation 306 determines how to match the received data structures with respective call appearances received at the workstation 306 by comparing the respective non-DNIS call identification data in the respective received data structures for conformity with the respective non-DNIS call identification data delivered to the workstation 306, together with the calls, by the network 12. That is, the workstation 306 associates a respective received call-context data structure (and the call-context information comprised therein) with a respective received call appearance based upon whether the non-DNIS call identification data comprised in the respective data structure matches that received with the call appearance from the network 12. After the workstation 306 has thus associated a respective received call-context data structure with a respective received call appearance, the agent 314 associated with workstation 306 may use, during the processing of the received call, the information contained in the respective data structure; for example, the workstation 306 may be configured to automatically display via interface 311 the call-context information of a particular call when that call is answered by the agent 314, and based upon the displayed information, the agent 314 may be better enabled to interact with the caller in a meaningful and productive manner.

The above-described call-context information/call appearance matching technique may also be used to advantage when call appearances result from or are associated with post-routing call processing. For example, in use in system 10, the agent 316' may be a supervisory agent who supervises the call processing activities of at least one other agent (e.g., agent 314') in the system 10. A table (not shown) is comprised in the configuration data 202 in the database 54 that correlates the agent IDs of supervised agents to the agent IDs of the supervisory agents assigned to them. The information in this table may be entered by the user 80 via the workstation 32 and may be stored and retrieved from the database 54, as needed by the router 48. In order to facilitate the supervision of supervised agent 314' by supervisory agent 316', a number of supervisory functions and operations may be implemented in system 10.

For example, when a call is initially routed to the workstation 306' via the network 12 and the PBX 56 in system 28, the call's call-context information be forwarded to the workstation 306' from the controller 304'. The workstation 306' may match/associate this call-context information with the call appearance at the device 310' by comparing the respective non-DNIS call identification data contained in the call-context information and provided to the device 310' from the network 12 (and forwarded by the PBX 56 of the system 28 from the network 12), in accordance with the above-described embodiment of the present invention. Contemporaneous with the receipt of the call at the workstation 306', the supervisory workstation 308' may receive from the controller 304' a notification that the agent 314' at workstation 306' is processing the call. The agent workstation 308' may also receive a notification of the nature of the call being processed. The notification may be displayed via interface 311'.

It is important to note that, due to transmission delays between the controller 302 and the controller 30, it is possible that the call that is initially routed by the routing engine 48 may arrive at the destination prior to receipt by the controller 302 of the call's call-context information from the controller 30; additionally, it is also possible that the call may never arrive at the destination (e.g., due to voice network failure or the caller going on-hook prior to delivery of the call at the destination). In these situations, a timer is set in the controller 302 to a predetermined time period, and after the time period has elapsed, unless the call is properly associated with its call-context information, the information is treated as invalid and is discarded by the controller 302, and the controller 302 may inform the routing engine 48 of a failure to properly associate the call with the call-context information.

At some point, supervisory agent 316' may decide to intervene in the processing of the call by the supervised agent 314'; alternatively, based upon the manner in which the processing of the call is progressing and the call-context information, the supervised agent 314' may request that the supervisory agent 316' intervene in such processing. The intervention of the supervisory agent 316' in such processing may be accomplished by the invocation by the supervisory agent 316' of one or more specialized supervisory functions/operations implemented in the system 10. Such supervisory functions/operations include the ability to send the agent 314' processing the call a message (e.g., detailing how the supervisory agent 316' wishes the call to be processed by the supervised agent 314'), the ability of the agent 316' to silently become a party to the call (i.e., in the manner of a conference call, except that the supervisory agent 316' may only listen to the interaction between the agent 314' and the caller), the ability of the agent 316' to force a conference call among the supervisory agent 316', supervised agent 314', and the caller, and the ability of the agent 316' to review, on demand, personnel and call processing-related statistics of the supervised agent 314' and/or call-context information received by the workstation 306'. The supervisory agent 316' and/or supervised agent 314' may also have the ability to request the establishment of consultative calls and call transfers.

More specifically, while processing a call received at device 310' of workstation 306', supervised agent 314' may command workstation 306' (via interface 311') to request the intervention of a supervisory agent in the supervised agent's processing of the call. In response to this command, the workstation 306' may generate and issue to the controller 304' a request for such intervention. The controller 304' may forward this request to the controller 302', which in response, may command the controller 304' to issue to the workstation 308' a message indicating the agent 314' has requested the intervention of the agent 316' in the call being processed by the agent 314', and to issue to the workstation 306' a message indicating that the former message has been sent to the agent 316'. When the workstation 308' receives the message from the controller 304', the workstation 306' may cause the interface 309' to provide an indication to the agent 316' that the agent 314' has requested such intervention.

In response to the indication provided by the interface 309' to the agent 316', the agent 316' may command the workstation 308' (via the interface 309') to provide to the agent 314' a message (hereinafter termed a "supervisory message") detailing how the agent 316' wishes the agent 314' to process the call. In response to this command, the workstation 308' may forward to the controller 304' a request that such a message be issued to the agent 314'. This request may reference the agent 314' using the agent ID of the agent 314'. The controller 304' may then forward this request from the workstation 308' to the controller 302', which in turn, may command the controller 304' to forward to the workstation 306' the supervisory message, and to provide to the workstation 308' an indication that the supervisory message has been sent to the workstation 306'.

Alternatively, or in addition thereto, the supervisory agent 316' may command the workstation 308' (via the interface 309') to initiate the establishment of an afore-described type of special "silent" conference call among the caller to the agent 314', the agent 314', and the agent 316'. In response to this command, the workstation 308' may forward to the controller 304' an OCR that such a conference call be established. This request may reference the agent 314' using the agent ID of the agent 314'. The controller 302' may then transmit to the router 48 a CRR based upon the OCR. In response to the CRR from the controller 302', the router 48 may determine the destination label associated with the agent 314', using the dialed number translation plan implemented via the DNPTT 206 described previously. Once the destination label associated with the agent 314' (i.e., of telephony device 310') has been determined by the router 48, the router 48 may provide the destination label to the controller 302'. The controller 302' may then control the PBX 56 and telephony devices 310', 312' so as to establish a conference call among telephony devices 310', 312' and the calling device (e.g., device 18) from which the initial call to agent 314' was routed. The controller 302' may also control the device 312' such that audio information may only be received by the device 312' and not transmitted from the device 312' to the calling device 18 and/or device 310' via the conference call. In this manner, the supervisory agent 316' may silently "listen in" to the interaction between the agent 314' and the caller at calling device 18; alternatively, once the conference call has been established, the controller 304' may cause interface 311' to provide the agent 314' with an indication that the "silent" conference is in progress.

Further alternatively, or in addition thereto, the supervisory agent 316' may command the workstation 308' (via the interface 309') to initiate the establishment of a forced conference call among the caller to the agent 314', the agent 314', and the agent 316' in which all parties to the conference call may exchange audio information. In response to this command, the workstation 308' may forward to the controller 304' an OCR that such a conference call be established. This request may reference the agent 314' using the agent ID of the agent 314'. The controller 304' may then forward the OCR to the controller 302', which in turn, may issue a CRR to the router 48. The router 48 may determine the destination label associated with the agent 314', using the dialed number translation plan implemented via the DNPTT 206 described previously. Once the destination label associated with the agent 314' (i.e., of telephony device 310') has been determined by the router 48, the router 48 may provide the destination label to the controller 302'. The controller 302' may then control the PBX 56 and telephony devices 310', 312' so as to establish a conference call among telephony devices 310', 312' and the calling device (e.g., device 18) from which the initial call to agent 314' was routed. In this manner, the supervisory agent 316', supervised agent 314', and caller at calling device 18 may mutually interact, and exchange audio information among each other via the thus established conference call.

Another type of supervisory function/operation that may be initiated by the supervisory agent 316' is the ability to review, on demand, personnel and call processing-related statistics of the supervised agent 314', supervised agent workgroups, supervised agent teams, and/or call-context information received by the workstation 306' (collectively or singly referred to hereinafter as "agent statistics"). More specifically, the agent 316' may command the workstation 308' (via the interface 309') to obtain from the controller 304' the agent statistics stored in the controller 304'. In response to this command, the workstation 308' may forward to the controller 304' a request for such agent statistics. This request may reference the agent 314' or agent workgroup/team using the agent ID of the agent 314' or the agent workgroup/team. In response to this request, the controller 304' may provide the requested agent statistics to the workstation 308'. Agent 316' may then review the requested agent statistics via the interface 309'.

The supervised agent 314' may also be able to request "emergency" or "panic" processing of a particular call. More specifically, during the course of processing a call received at device 310', it may become desirable to ensure both that the interaction and exchange of information between the agent 314' and caller at device 18 be recorded, and the supervisory agent 316' be invited to intervene in the processing of the call. When such conditions are present, the agent 314' may command workstation 306' (via interface 311') to initiate such emergency processing of the received call. In response to this command, the workstation 306' may both commence recording (e.g., using a conventional audio recording mechanism) of the interaction and exchange of information between the caller at device 18 and the agent 314', and may generate and issue to the controller 304' a request for the intervention of agent 316' in the processing of the call. The request for the intervention of the agent 316' in the processing of the call may be processed in above-described manner to provide to the agent 316' (via interface 311') an indication that the agent 314' has requested such intervention.

The supervisory agent 316' and/or supervised agent 314' may also have the ability to request the establishment of a consultative call between them. When either agent 314' or agent 316' wishes to request the establishment of a consultative call between them, the agent may command (via the user interface) the workstation with which the agent is associated to initiate the establishment of a consultative call, wherein an initial caller (at a calling device, e.g., device 18) of the agent requesting the consultative call is placed into a hold status when the consultative call is initiated, and another call segment is established between the requesting agent and the other agent, whereby to permit the two agents to exchange information between them concerning processing of the call placed by the held caller. In response to this command, the workstation may forward to the controller 304' an OCR that such a consultative call be established. The OCR may reference the agent with whom the consultative call is to be established, using the agent's agent ID. The controller 304' may forward the OCR to the controller 302', which may issue to the router 48, in response to receipt of the OCR, an appropriate CRR. In response to CRR from the controller 302', the router 48 may determine the destination label associated with the agent whom the consultative call is to be established, in the aforesaid manner, using dialed number translation plan implemented via the DNPTT 206. Once the destination label associated with the agent 314' (i.e., of telephony device 310') has been determined by the router 48, the router 48 may provide the destination label to the controller 302'. The controller 302' may then control the telephony device of the agent requesting the consultative call so as to place into a held status the call initially received thereat. The controller 302' may also control the PBX 56 of system 28 and telephony devices 310', 312' so as to establish a call connection between the telephony devices 310', 312'. The call-context information of the call initially received at the telephony device of the agent requesting the consultative call may be provided by the controller 304' to the workstation of the other agent in the consultative call. After the agent who requested the consultative call has completed a desired information exchange with the other agent involved in the consultative call, the former agent may issue a request (via commands issued to the agent's workstation via the agent's user interface) to the controller 302' that the consultative call be terminated. The controller 302' may then issue commands to devices 312', 310' and the PBX 56 of the system 28 that both cause the call connection between the devices 312', 310' to be terminated, and return the initially-established call from the caller at device 18 to an active (i.e., non-held) status.

The supervisory agent 316' and/or supervised agent 314' may also have the ability to request the transfer of a call from one agent to the other agent. When either agent 314' or agent 316' wishes to request such a transfer, the requesting agent may command (via the user interface) the workstation with which the requesting agent is associated to initiate the transfer of an initially established call (e.g., to the telephony device associated with the requesting agent from a caller at calling device 18) from the agent requesting the transfer, to the other agent. In response to this command, the workstation may forward to the controller 304' an OCR that such a transfer be established. The OCR may reference the agent with whom the transfer is to be established, using the agent's agent ID. The controller 304' may forward the OCR to the controller 302', which may issue to the router 48, in response to receipt of the OCR, an appropriate CRR. In response to the CRR from the controller 302', the router 48 may determine the destination label associated with the agent to whom the call is to be transferred, using the dialed number translation plan implemented via the DNPTT 206 described previously. Once the destination label associated with the agent to whom the call is to be transferred has been determined by the router 48, the router 48 may provide the destination label to the controller 302'. The controller 302' may then control telephony devices 310', 312' and the PBX 56 of the system 28 of the agent requesting the transfer so as to transfer the call to the other agent.

It is important to note that although the implementation of consultative call, conference call, and call transfer operations has been described in connection with supervisory and supervised agents, such operations may be also solely involve supervised agents, supervisory agents, and/or other or different types of agents, using the above-described principles of this embodiment of the present invention. Likewise, if the above processes are modified in ways apparent to those skilled in the art, a consultative call operation may be followed by a call transfer operation.

Additionally, it is important to note that the controllers 302', 304' are configured such that when a call is transferred from one agent to another agent, or agents are involved in a conference or consultative call, the call-context information of the initially established call is provided to each of the agent workstations involved in the call transfer, conference call, or consultative call operation so as to permit each of the agents to access such information and also such that an identical and consistent call context environment may be provided to each of the involved agents that is based upon the initially-established call and not the other call segments generated as a result of the transferring, conferencing or consultative operations. The agent workstations receiving such call-context information may match/associate that information with the call segments involved in such operations based upon matches between the non-DNIS call identification information contained in the call-context information and the corresponding information of the initially-established call. Additionally, any of the agents receiving such call-context information may modify/update such information at any time, and any and all such modifications/updates may be provided by the CTI controllers to all of the workstations of said agents.

It should be understood that above-described embodiments are being presented herein as examples and that many variations and alternatives thereof are possible. For example, if appropriately modified, the workstations and calling devices may be provisioned with appropriate mechanisms for establishing an IP telephony call via one or more of the networks 12, 14, 16 and/or via the same data network that is used to provide control and data messages between the workstations, the CTI controller, the local controller and the central controller. More specifically, instead of comprising Music 1×1™ cards, the calling devices and the calling devices and the telephony devices 310, 312, 310', 312', may each comprise respective Windows 2000™ h323 client and/or session initiated protocol TAPI service provider processes/devices for facilitating establishment of IP telephony calls among themselves via such networks. Advantageously, the use of such voice-over IP (VoIP) telephony offers cost advantages over traditional Plain Old Telephone Service (POTS) telephony, as in contradistinction to POTS telephony, both data and voice may be carried over the same network connection using such VoIP telephony. This is particularly attractive given the widespread and increasing availability of high speed broadband services. Accordingly, the present invention should be viewed broadly as being defined only as set forth in the hereinafter appended claims.

What is claimed is:

1. An apparatus comprising:
   one or more processors;
   a memory coupled to the processors comprising one or more instructions executable at the processors, the processors operable when executing the instructions to:
   identify receipt at the apparatus of an appearance of a telephone call from a network;
   identify receipt at the apparatus of call-context data associated with the telephone call from a central controller apart from the apparatus, the call-context data comprising at least some data other than dialed-number identification service (DNIS) data; and
   associate the telephone call with the call-context data according to first data identifying the telephone call and second data identifying the call-context data.

2. The apparatus of claim 1, wherein the call-context data comprises data describing one or more previous transactions involving a caller of the telephone call.

3. The apparatus of claim 1, wherein the call-context comprises automatic number identification (ANI) data or calling-line identification (CLID) data.

4. The apparatus of claim 1, wherein the appearance of the telephone call has reached the apparatus via a private branch exchange (PBX) coupled to the network.

5. The apparatus of claim 1, wherein the first data and the second data comprise automatic number identification (ANI) data, calling-line identification (CLID) data, or a correlation identification information.

6. The apparatus of claim 1, wherein one or more segments of a connection supporting the telephone call comprise voice over Internet Protocol (VoIP).

7. The apparatus of claim 1, wherein one or more portions of the network comprise one or more portions of a Public Switched Telephone Network (PSTN).

8. The apparatus of claim 1, wherein the apparatus is a supervised agent workstation.

9. The apparatus of claim 8, wherein the processors are further operable when executing the instructions to communicate at least some of the call-context data for display to a super-vised agent at the supervised agent workstation.

10. A method comprising:
    identifying at an agent workstation receipt of an appearance of a telephone call from a network;
    identifying at the agent workstation receipt of call-context data associated with the telephone call from a central controller apart from the agent workstation, the call-context data comprising at least some data other than dialed-number identification service (DNIS) data; and
    at the agent workstation, associating the telephone call with the call-context data according to first data identifying the telephone call and second data identifying the call-context data.

11. The method of claim 10, wherein the call-context data comprises data describing one or more previous transactions involving a caller of the telephone call.

12. The method of claim 10, wherein the call-context comprises automatic number identification (ANI) data or calling-line identification (CLID) data.

13. The method of claim 10, wherein the appearance of the telephone call has reached the agent workstation via a private branch exchange (PBX) coupled to the network.

14. The method of claim 10, wherein the first data and the second data comprise automatic number identification (ANI) data, calling-line identification (CLID) data, or correlation identification information.

15. The method of claim 10, wherein one or more segments of a connection supporting the telephone call comprise voice over Internet Protocol (VoIP).

16. The method of claim 10, wherein one or more portions of the network comprise one or more portions of a Public Switched Telephone Network (PSTN).

17. The method of claim 10, wherein the agent workstation is a supervised agent workstation.

18. The method of claim 17, further comprising communicating at least some of the call-context data for display to a supervised agent at the supervised agent workstation.

19. A system comprising:
    means for identifying at an agent workstation receipt of an appearance of a telephone call from a network;
    means for identifying at the agent workstation receipt of call-context data associated with the telephone call from a central controller apart from the agent workstation, the call-context data comprising at least some data other than dialed-number identification service (DNIS) data; and
    means for associating, at the agent workstation, the telephone call with the call-context data according to first data identifying the telephone call and second data identifying the call-context data.

20. A system comprising:
    a central controller operable to:
      access call-context data associated with a telephone call from a network appearing at an agent workstation coupled to the central controller, the call-context data comprising at least some data other than dialed-number identification service (DNIS) data; and
      communicate the call-context data to the agent workstation; and
    the agent workstation, operable to:
      identify receipt at the agent workstation of an appearance of a telephone call from a network;
      identify receipt at the agent workstation of the call-context data associated with the telephone call from the central controller; and
      associate the telephone call with the call-context data according to first data identifying the telephone call and second data identifying the call-context data.

* * * * *